2,959,542
Patented Nov. 8, 1960

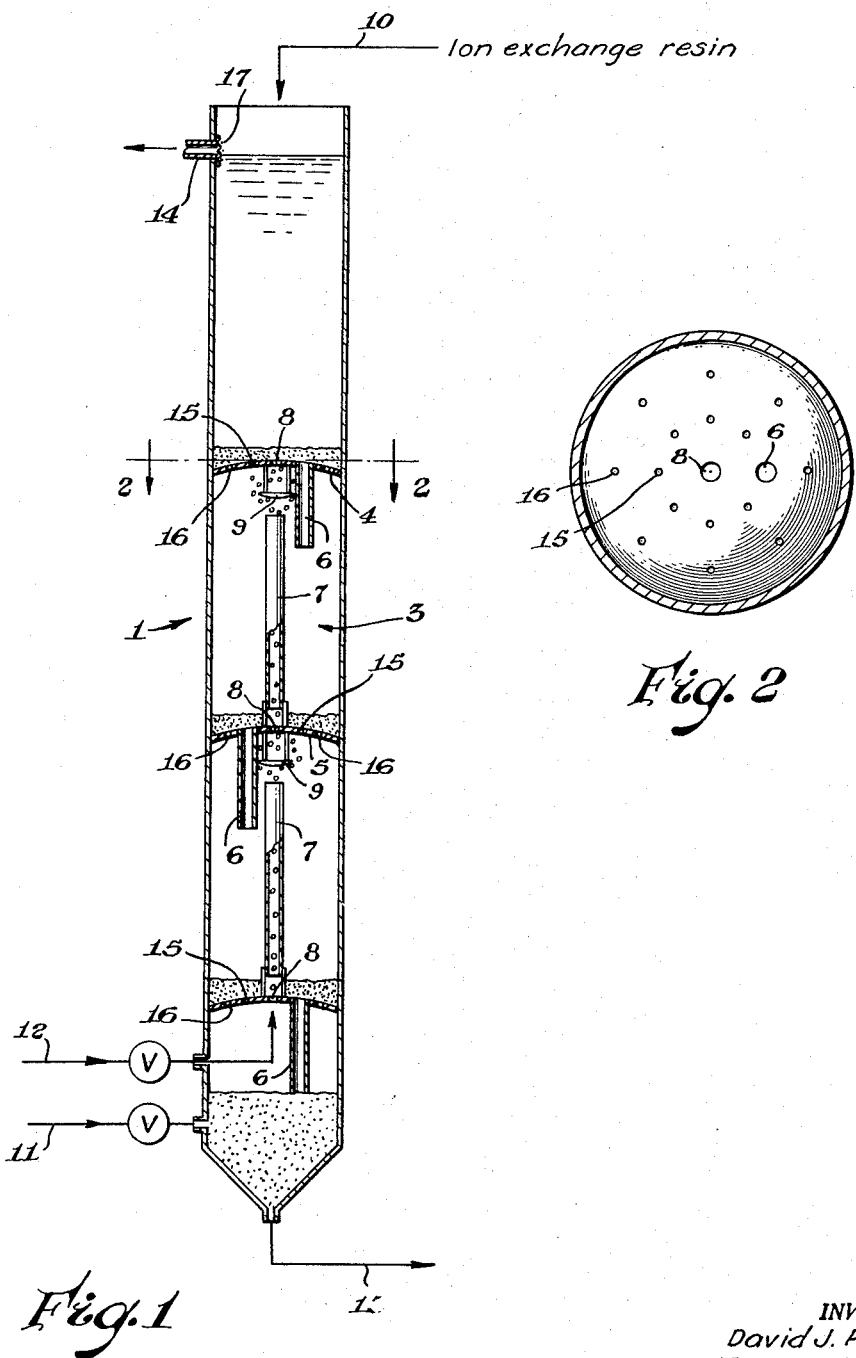

2,959,542

CONTINUOUS GAS-LIFT ION-EXCHANGE PROCESS AND APPARATUS

David J. Pye, Walnut Creek, and George F. Schurz, Oakley, Calif., assignors to The Dow Chemical Company, Midland, Mich., a corporation of Delaware Filed Mar. 8, 1957, Ser. No. 644,779

4 Claims. (Cl. 210—33)

This invention relates to an improved method and apparatus for carrying out ion-exchange reactions to effect a concentration of desired cations and/or anions. More particularly, it relates to a continuous process and apparatus for carrying out ion exchange reactions in which a fluid mass of ion exchange resin is flowed counter-currently to a solution of one or more salts through a plurality of absorption chambers utilizing a novel gas agitation means to facilitate maximum contact of solution with ion exchange resin particles. The invention pertains particularly to the treatment of dilute solutions of magnesium, for example, sea-water or other magnesium-containing natural brines, to produce solutions containing magnesium salts in higher molal concentrations.

The method of the invention, and the apparatus in which the new process is carried out, will be described with reference to the accompanying drawings wherein, Figure 1 is a schematic drawing of a vertical column showing an arrangement of the principal major elements of the apparatus. Fig. 2 is a horizontal section through the column, taken along line 2—2 of Fig. 1.

In the drawing the numeral 1 indicates a vertical column having a plurality of chambers 3 defined by an upper plate 4 and a lower plate 5, said plates being convexed upwardly and having multiple perforations, a downcomer tube 6 depending from each upper plate 4 to a point intermediate it and the next lower plate 5, said downcomer tubes being staggered in series, each chamber having a lift tube 7 in spaced apart relationship from said plates 4 and 5 and in line with an axial inlet 8 in each plate of each chamber, each such plate having a dependent baffle 9 convexed downwardly in spaced apart relationship therefrom and in line with said axial inlet 8 and said lift tube 7, a regulatable inlet means 10 such as a valved inlet or hopper at the top of said column for the introduction of a descending particulate solid, a regulatable inlet means 11 at the bottom of said column for the introduction of an ascending liquid, a regulatable inlet means 12 for the introduction of an ascending gas through said lift tubes 7 for agitating and circulating said descending solid in suspension in said liquid in a region of turbulence within said chambers to promote intimate contact of said solid with said ascending liquid, an exhaust means 13 for removing the particulate solid from the lowermost chamber of the column and an outlet 14 for removing treated liquid from the uppermost section of the column, said outlet having a screen 17 or other retaining means for preventing loss of ion exchange material. Figure 2 is a horizontal section taken along line 2—2 of Fig. 1, and illustrates a typical plate having the downcomer tube 6, axial inlet 8 and multiple perforations 15 and 16.

For purposes of illustration only, the process of this invention will be described in terms of the recovery of magnesium ions from sea-water. A descending mass of particulate sulfonated polymeric styrene cation exchange resin is fed in above the top plate 4 of the multi-chambered column through inlet means 10 and moves down the column through staggered downcomers 6 and is removed substantially saturated with magnesium ions through exhaust means 13 below the bottom plate. Seawater is fed to the column through inlet 11. Air or any gas which is inert under reaction conditions enters through inlet 12 and below the bottom plate. The seawater moves up through perforations 15, 16 while the air moves up through the lift tubes 7. As the sea-water and resin are aspirated through the lift tubes 7, they are intimately and turbulently contacted. The baffles 9 below each plate serve to deflect the resin and prevent its moving through inlet 8 to the plate above. The plates are convexed upwardly to direct the air to inlet 8. In this manner any stray air bubbles not coming up the air riser tubes are collected at the axial inlets 8 and enter the chamber above and rise through the lift tubes 7. The air stream aspirating the suspension of resin in seawater as it rises through lift tubes 7 creates a region of turbulence within each chamber. Upon striking the baffles 9 which are convexed downwardly, the resin is deflected outwardly from the lift tubes 7 and settles to the bottom of the chamber where at least a portion of the resin is again aspirated through the lift tube. The treated solution is withdrawn from the uppermost section of the column at 14. The process of this invention thus provides much more intimate contact between ion exchange resin and sea-water than would be obtainable without the airlift column.

The respective ion exchange resin, sea-water and air feeds can be balanced by means of metering valves or equivalents throughout wide ranges. The apparatus, once adjusted, is self-regulating. It has good feed-back, i.e., it is self-correcting. For example, should the resin begin to feed too rapidly, the downcomers would feed the resin downwardly throughout the remaining chambers at a faster rate and the system would soon be adjusted. On the other hand, if the resin feed should begin to slow down, less resin would be fed out through the downcomer tubes, and the system would again soon be in balance.

The reacted cation exchange resin is withdrawn from the lowermost chamber of the column, and eluted to separate and recover magnesium in usual ways. The regenerated resin is recycled to the process. The repeated intensive mixing of ion exchange resin and sea-water promoted by the rising air-column effectuates rapid chemical absorption of the magnesium ions. This is largely attributable to the improved contact efficiency, i.e., the uniformity of contact between resin and sea-water with consequent reduction of liquid film resistance to mass transfer. Overall contact efficiency is improved by multiplying the number of chambers in such an ion exchange column. Larger columns may have multiple elements within each chamber, i.e., multiple resin downcomer tubes, multiple air-riser tubes, multiple baffles and multiple inlets.

Corollary to the improved contact efficiency promoted by the process and apparatus of this invention are greatly reduced resin inventories and greatly reduced inventory times for loading the cation exchange resin to its equilibrium magnesium concentration. This has resulted in the need of not more than 150 percent of theoretical sea-water for magnesium saturation of a sulfonated polymeric styrene cation exchange resin as compared with 900 to 1000 percent of theoretical sea-water with previously used packed absorption units, magnesium equivalence basis.

The following examples show ways in which the invention has been practiced.

EXAMPLE 1

A column similar to that of Fig. 1 was constructed with 7 cylindrical chambers. Each chamber was approximately 18 inches high and 4 inches in diameter. The column was filled with partially-diluted sea water, and a particulate sulfonated polymeric styrene cation exchange resin in the sodium form was metered in at the top, as previously described. At the same time, air was admitted at the bottom of the column at about 0.05 standard cubic feet per minute per square foot of column area, and partially-diluted sea water simultaneously was admitted at the bottom at a flow rate sufficient to give a linear flow rate across the cross section of the chambers of about 0.57 feet per minute. The sea water thus had an average residence time in the column of about 18 minutes. The flow rate of the resin entering the top of the column was adjusted to about 20 cubic centimeters per minute. The resin thus had a residence time in the column of about 50 minutes.

Under the above conditions, the continuous resin effluent from the bottom of the column was found to have 94.3 percent of its theoretic equilibrium capacity for divalent metals ($Ca^{++}$ and $Mg^{++}$) taken up by such ions. In achieving this loading, a resin inventory of only 42.3 parts by weight per part of magnesium absorbed was present. This resin inventory was contacted with sea water containing about 4.3 parts of magnesium in order to produce a resin effluent containing one part of magnesium.

EXAMPLE 2

In an experiment carried out in a manner similar to that of Example 1, the resin flow rate to the 7-plate column was increased to about 85 cc. per minute. The resin thus had a residence time of about 19 minutes. The sea-water flow rate was 0.74 linear feet per minute, equivalent to a residence time of about 14 minutes.

Under these conditions, the resin effluent was found to have 75.5 percent of its theoretic equilibrium capacity for divalent ions taken up by such ions. A resin inventory of about 44 parts per part by weight of magnesium absorbed was present. This inventory of resin was contacted with sea water containing about 1.67 parts of magnesium in order to produce a resin effluent containing one part of magnesium.

In contrast to the above two examples, there follow the conditions required by one of the most efficient methods known in the prior art. A conventional packed, moving-bed, ion-exchange resin column 16 feet high was fed with the same ion exchange resin as used in Example 1 at a rate of 14,100 cc. per minute. The resin thus had a residence time of about 400 minutes. Sea water was admitted to this column at a rate of about 0.4 linear feet per minute and thus had a residence time of about 18 minutes. Under these conditions a resin inventory of about 750 parts by weight of resin per part of magnesium absorbed was present and this resin inventory was contacted with sea water containing 17 parts of magnesium to produce a resin effluent containing one part of magnesium.

In this conventional type of system, the resin effluent was found to have 77 percent of its theoretical equilibrium capacity for divalent ions taken up by such ions. When compared to Example 2 above, it can be seen that approximately the same approach to equilibrium was attained when the method and apparatus of the present invention were used, but with a vastly smaller resin inventory, residence time of resin and volume of sea water required. Even when conditions were adjusted, as in Example 1, to give nearly complete saturation of the resin's capacity, the volume of sea water with which it was necessary to contact the resin was still only about one-fourth that required by the conventional column.

EXAMPLE 3

A method of estimating the contact efficiency of an ion exchange technique has been described by Kressman and Kitchener, Discussions of the Faraday Society, No. 7, page 90, 1949. These investigators designed a method to minimize or eliminate resistance to ion transfer, in the film surrounding the resin particle, by using high-speed agitation of a quantity of resin. Their method thus gives the maximum possible ion exchange rate for a given ion transfer.

The method of Kressman and Kitchener was used as follows: Twenty milliliters of a sulfonated polystyrene cation exchange resin in the sodium form was placed in a cylindrical screen container that was capable of being rotated at about 900 revolutions per minute. The container was immersed in 500 milliliters of an aqueous solution containing 0.5 molar sodium chloride and 0.055 molar magnesium chloride. While the container was rotated at the above rate, samples of the solution were withdrawn at intervals and analyzed in order to determine the rate of absorption of magnesium. It was found that after 1.7 minutes the resin had absorbed 50 percent as much magnesium ion as the resin would contain when at equilibrium with this solution. After 7 minutes, the resin had absorbed 80 percent of its theoretical equilibrium capacity. The rate indicated by these figures can be assumed to be approximately the maximum possible rate in this system.

The contact efficiency of the method and apparatus of the present invention was determined by using one of the cylindrical air-agitated chambers described herein with the same resin and aqueous solution as above. In this test, the resin had absorbed 50 percent of its theoretical equilibrium capacity for magnesium ion in 2 minutes, and 80 percent of such value in 8.7 minutes. Thus, the ion exchange rate of the present invention has been found to be almost as rapid as the maximum possible.

The following table summarizes other results obtained with 6-plate, 7-plate and 10-plate air-type ion exchange columns in a series of experiments wherein the ion exchange resin absorbed an amount of magnesium as stated in the table, in each case using portions of the same batch of a sulfonated polymeric styrene cation exchange resin and portions of a similar sea-water feed.

*Table*

6-PLATE COLUMN

| Run | Resin Loading, Percent mg. | Resin Inventory, ccs. | Resin Rate, ccs./min. | Inventory Time, mins. | S. W. Rate, linear ft./min. | Remarks |
|---|---|---|---|---|---|---|
| 1 | 1.30 | 1,400 | 170 | 8.2 | 0.54 | Untreated S. W. |
| 2 | 1.87 | 1,400 | 67 | 21 | 0.43 | Do. |
| 3 | 1.50 | 1,400 | 135 | 10.5 | 0.55 | Do. |
| 4 | 1.34 | 1,400 | 90 | 15.5 | 0.276 | Do. |

7-PLATE COLUMN

| | | | | | | |
|---|---|---|---|---|---|---|
| 1 | 1.77 | 2,000 | 100 | 20 | 0.87 | Pre-treated S. W.[1] |
| 2 | 2.38 | 1,800 | 65 | 28 | 0.81 | Do. |
| 3 | 2.40 | 1,700 | 40 | 42.5 | 0.80 | Do. |
| 4 | 1.89 | 6,000 | 115 | 52 | 0.73 | Do. |
| 5 | 1.98 | 4,000 | 205 | 19.5 | 1.26 | Do. |
| 6 | 2.38 | 2,350 | 65 | 36 | 1.18 | Do. |

10-PLATE COLUMN

| | | | | | | |
|---|---|---|---|---|---|---|
| 1 | 1.35 | 2,900 | 100 | 29 | 0.55 | Untreated S. W. |
| 2 | 1.69 | 3,600 | 100 | 36 | 0.55 | Do. |
| 3 | 1.70 | 3,100 | 125 | 25 | 0.66 | Do. |
| 4 | 2.16 | 3,800 | 63 | 60 | 0.79 | Do. |
| 5 | 1.51 | 3,200 | 102 | 30 | 0.55 | Do. |
| 6 | 1.56 | 2,500 | 187 | 13.4 | 0.73 | Do. |
| 7 | 2.15 | 2,300 | 50 | 46 | 0.81 | Do. |
| 8 | 2.09 | 3,100 | 79 | 39 | 0.55 | Pre-treated S. W. |

[1] Calcium removed.

While the process of this invention has been described in terms of absorbing magnesium ions from sea-water utilizing a cation exchange resin, the process is broadly applicable to concentrating ions, both anions and/or cations, in aqueous solutions by means of anion exchange resins, cation exchange resins or mixed bed resins. In any instance, variations in rate of feed in ion exchange resin, electrolyte solution, and air or equivalent inert gas are readily determined by a trial run. One needs only to adjust the metering valves or equivalents to get a desired balance. Once in balance, the apparatus is self-regulating.

The apparatus of this invention is likewise susceptible of wide variations. Given the overall concept disclosed herein and the concrete embodiments described herein, it is now within the skill of the art to devise adaptions of such apparatus within the scope of this invention. The cross sectional areas of the various inlet and outlet means can be varied practically infinitely to attain operable apparatuses within the scope of this invention wherein rates of feed of solid, liquid and gas can be balanced so as to attain a desired continuous turbulent agitation for expediting chemical and/or physical reactions between a solid and a solution.

What is claimed is:

1. A process for concentrating ions of ionizable solutes in a continuous manner, which process comprises feeding a descending mass of a particulate ion exchange material into the top of a multiple chambered column, feeding an ascending aqueous solution of an ionizable compound into the bottom of said column, said ion exchange material and said aqueous solution being agitated within each chamber of said multiple chambered column by a rising stream of inert gas entering through an axial inlet at the bottom of each chamber and leaving through an axial outlet at the top of each chamber after having been deflected by a baffle below said top axial outlet, the ion exchange material, aqueous solution and gas feeds being regulated so as to form a suspension of said ion exchange material in said solution in a region of turbulence within said chambers wherein said ion exchange material is caused to have a longer residence time in said chamber than would be realized in the absence of said stream of gas, feeding settled ion exchange material from one chamber to the next lower chamber in an offset line, discharging treated aqueous solution from the uppermost section of the column, withdrawing reacted ion exchange material from the lowermost chamber of said column and recovering chemically absorbed ions from said reacted ion exchange material.

2. The process of claim 1 wherein said reacted ion exchange material is regenerated and recycled through the process.

3. The process of claim 1 wherein the ion exchange material is a sulfonated polymeric styrene cation exchanger, the aqueous solution of ionizable compound is sea-water and the feed of sea-water is not more than about 150 percent of theoretic sea-water required for magnesium saturation of said cation exchange material.

4. An apparatus comprising a vertical column having a plurality of chambers defined by an upper plate and a lower plate, said plates being convexed upwardly and having multiple perforations, a downcomer tube wholly depending from each upper plate to a point intermediate it and the next lower plate, said downcomer tubes being staggered from plate to plate, each chamber having a lift tube fixedly attached above said plates and in line with an axial inlet in each plate of said chambers, said multiple perforations being distributed about the axial inlets and the downcomer tube inlets, each such plate having a wholly dependent baffle convexed downwardly in spaced apart relationship therefrom and in line with said lift tube, a regulatable inlet means at the bottom of said column for the introduction of an ascending liquid, a regulatable inlet means at the top of said column for the introduction of a descending particulate solid, a regulatable inlet means for the introduction of an ascending gas through said lift tubes for agitating said descending particulate solid in suspension in said liquid in a region of turbulence within said chambers to promote intimate contact of said solid with said ascending liquid, an exhaust means for removing reacted particulate solid from the lowermost chamber of the column and a discharge means in the uppermost section of the column for removing treated liquid.

References Cited in the file of this patent

UNITED STATES PATENTS

| | | |
|---|---|---|
| 185,900 | Ellerhorst | Jan. 2, 1877 |
| 1,608,661 | Nordell | Nov. 30, 1926 |
| 2,520,391 | Findlay | Aug. 29, 1950 |
| 2,671,714 | McIlhenny | Mar. 9, 1954 |

FOREIGN PATENTS

| | | |
|---|---|---|
| 290,373 | Germany | Apr. 26, 1914 |